(12) United States Patent
Starke et al.

(10) Patent No.: US 6,643,763 B1
(45) Date of Patent: Nov. 4, 2003

(54) REGISTER PIPE FOR MULTI-PROCESSING ENGINE ENVIRONMENT

(75) Inventors: William J. Starke, Austin, TX (US); Joseph L. Temple, III, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/514,435

(22) Filed: Feb. 28, 2000

(51) Int. Cl.[7] .......................... G06F 15/17; G06F 15/82
(52) U.S. Cl. .............................. 712/11; 712/20; 712/29; 712/27; 709/238; 709/216
(58) Field of Search .............................. 712/11, 21, 22, 712/201, 20, 219, 235, 29, 27, 225; 711/218, 203, 147, 153, 129; 709/218, 238, 216

(56) References Cited

U.S. PATENT DOCUMENTS

| | | | |
|---|---|---|---|
| 4,891,787 A | 1/1990 | Gifford | 364/900 |
| 4,901,230 A | 2/1990 | Chen et al. | 364/200 |
| 4,916,652 A | 4/1990 | Schwarz et al. | 364/748 |
| 5,212,777 A | 5/1993 | Gove et al. | 395/375 |
| 5,212,778 A * | 5/1993 | Dally et al. | 711/218 |
| 5,355,508 A | 10/1994 | Kan | 395/800 |
| 5,408,671 A | 4/1995 | Tanaka | 395/800 |
| 5,471,593 A * | 11/1995 | Branigin | 712/235 |
| 5,475,856 A | 12/1995 | Kogge | 395/800 |
| 5,524,255 A | 6/1996 | Beard et al. | 395/800 |
| 5,526,487 A | 6/1996 | Schiffleger | 395/821 |
| 5,778,221 A | 7/1998 | Temple | 395/591 |
| 5,805,915 A | 9/1998 | Wilkinson et al. | 395/800.2 |
| 5,875,342 A | 2/1999 | Temple | 395/733 |
| 5,889,947 A | 3/1999 | Starke | 395/200.43 |
| 5,937,199 A | 8/1999 | Temple | 395/735 |
| 6,345,301 B1 * | 2/2002 | Burns et al. | 709/230 |

* cited by examiner

*Primary Examiner*—Daniel H. Pan
(74) *Attorney, Agent, or Firm*—Floyd A. Gonzalez, Esq.; Marc A. Ehrlich, Esq.; Heslin Rothenberg Farley & Mesiti P.C.

(57) ABSTRACT

Method, system and program storage device are provided for implementing a register pipe between processing engines of a multiprocessor computing system. A register pipe includes at least one first register of a first processing engine and at least one second register of a second processing engine. Data is transferred between the first processing engine and the second processing engine through the register pipe without passing through memory. In one embodiment, general purpose registers within the first processing engine and within the second processing engine are employed to implement the register pipe. A control mechanism is provided within each processing engine to dynamically enable or disable the register pipe coupling any two processing engines of the multiprocessor computer system. A technique for broadcasting to multiple register pipes and for implementing barrier synchronization using a register pipe addressed to a processing engine itself are also provided.

61 Claims, 13 Drawing Sheets

| ACR STATE | ADDRESS | TARGET |
|---|---|---|
| 00 | PRIVATE—ALWAYS ADDRESS MEMORY | PRIVATE—ONLY LOAD FROM LOCAL OTHERWISE NOOP |
| 01 | JOINED—ADDRESS MEMORY AND BROADCAST IF LOCAL | JOINED—WAIT FOR BROADCAST IF NOT LOCAL |
| 10, 11 | FORCE INTERLEAVE TO LOCAL AND ADDRESS MEMORY | ONLY UPDATE WHEN ADDRESS REGISTER IS JOINED |

*fig. 4A*

ACR STATES

| ACR IC BIT | ACR RB BITS | RB | RT UPDATE (LOAD) | IC UPDATE (BRANCH) |
|---|---|---|---|---|
| 0 | 00 | FORKED, LOCAL ACCESS | LOCAL, ACR→00 | ACR→00 |
| 0 | 01 | JOINED, LOCAL FOR LOAD EID MATCH FOR BRANCH | LOCAL, ACR→00 | BROADCAST, ACR→1 |
| 0 | 10 | JOINED | ERROR | ERROR |
| 0 | 11 | RESERVED | RESERVED | RESERVED |
| 1 | 00 | FORKED, LOCAL ACCESS | LOCAL, ACR→00 | ACR→0 |
| 1 | 01 | JOINED, EID MATCH | BROADCAST ACR→00 | BROADCAST, ACR→1 |
| 1 | 10 | FORCE EID MATCH | LOCAL, ACR→00 | ACR→0 |
| 1 | 11 | RESERVED | RESERVED | RESERVED |

LFA INSTRUCTION WILL SET ACR FOR RT TO 10
LJA INSTRUCTION WILL SET ACR FOR RT TO 01
BAB AND LJA CAUSE BROADCASTS FROM EID = 0
BAB WILL SET THE ACR BIT FOR THE IC TO 1 fig. 4B

REGISTER PIPE FOR MULTI-PROCESSING ENGINE ENVIRONMENT

CROSS-REFERENCE TO RELATED APPLICATION

This patent application is related to commonly assigned, co-filed patent application Ser. No. 09/514,630, by Coscarella et al. entitled "Composite Uniprocessor," which is hereby incorporated herein by reference in its entirety.

TECHNICAL FIELD

This invention relates in general to multiprocessor computing systems and, more particularly, to a multiprocessor computing system capable of selectively implementing a register pipe between a pair of processing engines of the multiprocessor computing system to facilitate transfer of data therebetween.

BACKGROUND ART

Generally speaking, computer programs may be executed by computing systems in various modes. For instance, any of a single instruction stream single data stream (SISD) mode; a single instruction stream multiple data stream (SIMD) mode; a single program multiple data stream (SPMD) mode; or a multiple instruction stream multiple data stream (MIMD) mode may be used to execute a typical computer program.

In SISD mode, a computer program generates and executes a single instruction stream to produce a single data stream or result. This is commonly referred to as a. classical uniprocessor mode of operation. In addition, operation in a SISD mode often occurs even in multiprocessor or parallel systems. This may occur due to programming techniques, algorithmic serialization, or legacy from past implementations.

In many multiple processor or multiprocessor systems, computer programs may be executed in SIMD mode. In this mode, several pieces of data are simultaneously processed by a single instruction. Thus, several processors or processing elements may operate on a same instruction but with separate data streams. In the SPMD variant of this mode, each processor executes a same program, which is fetched independently, and operates on its own data stream. Operation in SPMD mode allows the various processors to be attached only to local memory and communicate results over a message passing fabric or network.

In other multiprocessor systems, programs may be executed in a MIMD mode where each processor operates independently not only on its own data streams, but also on its own instruction streams. Processing in this mode is facilitated by either shared storage or by passing messages between the processors.

Classical multiprocessors, or shared memory processors (SMPs), allow programs to be executed in either SISD or MIMD modes, and sometimes in SPMD mode. However, these machines suffer from memory contention constraints. Because of this, the granularity of parallelism is usually limited to a level at which it is beneficial to execute several program-managed threads or processes which communicate by sharing memory.

When input values for an operation to be executed by one processor are results (i.e., output values) of another instruction executed by another processor within a shared memory multiprocessor environment, the processing of the operation becomes more complex. First, in order for the first processor to obtain the results to be utilized as input values, the second processor must first store the output values to memory so that the first processor may then retrieve the results from memory. As will be appreciated, these prerequisite steps consume additional instructions and clock cycles to store and load values from one processor to the other, thereby creating substantial inefficiencies and undesirable consumption of processor power. Also, the execution of instructions requiring the results of other executed instructions as inputs requires that the processors be synchronized to ensure that the first processor is accessing the appropriate results in memory and not some prior, outdated values. Conventionally, complicated procedures of data management are employed to ensure that memory coherency is maintained in the system.

In view of these processing complexities, it is desirable to facilitate a more efficient transfer of information between processing engines in a multiprocessor computer system.

DISCLOSURE OF THE INVENTION

Provided herein, therefore, is a register pipe facility disposed between a pair of processing engines in a multiprocessor computer system. This register pipe allows data to be transferred from a first processing engine to a second processing engine without passing through memory of the computer system. Further, the register pipe provided herein can be implemented dynamically using general purpose registers of the processing engines themselves to be connected by the pipe within the multiprocessor computer system.

To summarize, in one aspect, provided herein is a method of transferring data between a first processing engine and a second processing engine. The method includes: establishing a register pipe-between the first processing engine and the second processing engine, the register pipe may include at least one first register in the first processing engine and at least one second register in the second processing engine; and transferring data between the first processing engine and the second processing engine using the register pipe, wherein data is transferred between the first and second processing engines without passing through main memory of the multiprocessor computer system to which the first processing engine and second processing engine belong.

In another aspect, a system of transferring data between a first processing engine and a second processing engine is provided. The system includes means for establishing a register pipe between the first processing engine and the second processing engine, wherein the register pipe may include at least one first register of the first processing engine and at least one second register of the second processing engine. The system further includes means for transferring data between the first processing engine and the second processing engine using the register pipe, wherein data is transferred between the first and second processing engines without passing through memory of the multiprocessor computer system to which the first and second processing systems belong.

In still another aspect, a multiprocessor computer system is provided which includes a first processing engine and a second processing engine. The multiprocessor computer system comprises a register pipe between the first processing engine and the second processing engine, wherein the register pipe includes at least one first register in the first processing engine and at least one second register in the second processing engine. The first processing engine and the second processing engine are adapted to transfer data therebetween using the register pipe and without passing the data through memory of the multiprocessor computer system.

In a further aspect, at least one program storage device readable by a machine, tangibly embodying at least one program of instructions executable by the machine is provided to perform a method of transferring data between a first processing engine and a second processing engine. The method includes: establishing a register pipe between the first processing engine and the second processing engine, the register pipe may include at least one first register in the first processing engine and at least one second register in the second processing engine; and transferring data between the first processing engine and the second processing engine using the register pipe, wherein data is transferred between the first and second processing engines without passing through main memory of the multiprocessor computer system to which the first processing engine and the second processing engine belong.

To restate, provided herein is a register pipe facility and technique for establishing a register pipe between a pair of processing engines of a multiprocessor computer system to facilitate transfer of data therebetween without using, for example, main memory of the computer system. In a parallel processing system which is loosely coupled, the register pipes presented herein provide a faster more efficient means to communicate data between processors using a finer grain (i.e., smaller pieces of data). Specifically, loosely coupled machines typically use input/output (I/O) to move data from machine to machine. This usually means the movement of data results into memory, where the results are buffered, and then the execution of a program which moves the data either synchronously or asynchronously from memory to the other machine. This approach is contrasted with the register pipes facility presented herein which simply targets a pipe register with a data result.

In a tightly coupled parallel processing system (SMP or memory sharing system) register pipes as presented herein are still more efficient. In such a system, data results must conventionally be stored to memory, the processors then synchronized, and the data fetched to the target machine. This is contrasted with simply targeting a register pipe with a data result to be transferred from one machine to another in accordance with the principles of the present invention.

In a massive cache machine such as described in the cross-referenced and incorporated application entitled "Composite Uniprocessor," or other SIMD capable machine, data results must still be stored and then fetched using joined registers. In accordance with the present invention, data results are transferred simply by targeting a register pipe with the result. Register pipes as presented herein are a way for multiprocessor machines to avoid storing data results, then loading the results from one engine when needed by another engine. While storing data before loading is only an additional instruction, this additional instruction can add up if it is an inner loop of a program.

Additional features and advantages are realized through the techniques of the present invention. Other embodiments and aspects of the invention are described in detail herein and are considered part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 4A and 4B describe various operating states of general purpose registers of the processor of FIGS. 1 and 2, in accordance with the principles of the present invention;

BEST MODE FOR CARRYING OUT THE INVENTION

In accordance with one aspect of the present invention, a technique for operating a computing system by relying on joining and forking registers is provided. By doing so, the technique of the present invention advantageously allows the processors of a computing system to contain a same piece of information, when the registers are joined, and different pieces of information, when the registers are forked. Consequently, the computing system may rapidly and efficiently switch between multiple modes of operation. In addition, the present invention also provides for a higher memory bandwidth and a larger, faster cache through the partitioning of memory and through the fetching and broadcasting of information by a processor local to a particular section.

Figure 1:
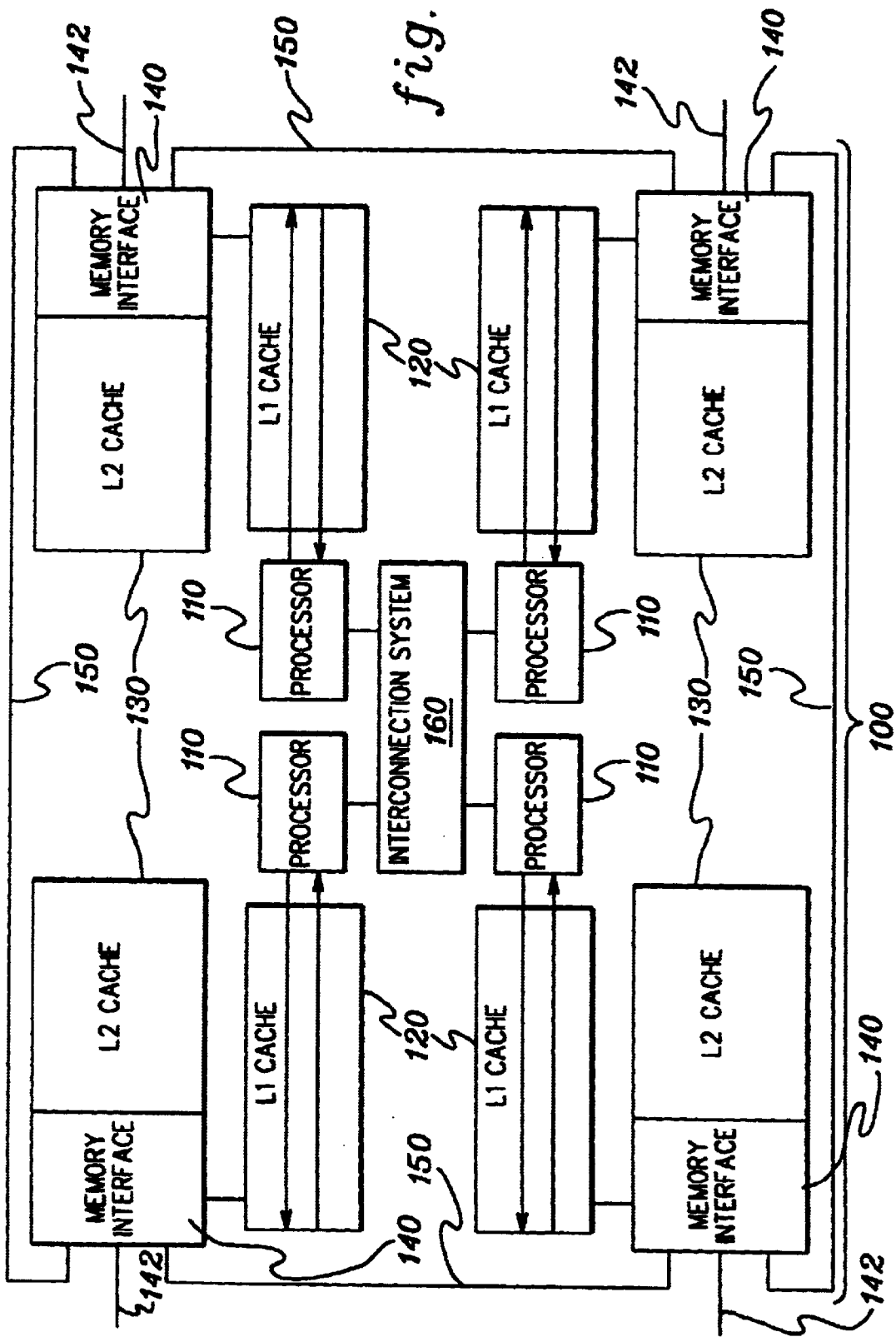
FIG. 1 depicts one example of a computing system capable of operating in a uniprocessor mode and in a parallel processing mode, in accordance with the principles of the present invention.

In accordance with one aspect of the present invention, FIG. 1 depicts a multiprocessor computer system 100 capable of operating alternatively as a uniprocessor (i.e., generating a single instruction and data stream) and as a parallel processor (i.e., generating multiple instruction and data streams). In one embodiment, computing system 100 includes a plurality of processors or engines 110 (i.e., processors 00, 01, 10, and 11), with each processor having associated therewith and connected thereto an L1 cache 120. In this particular embodiment, computing system 100 is shown as being located on a single chip. However, other embodiments with components located on multiple chips are possible without departing from the principles of the invention.

L1 caches 120 connect processors 110 to L2 caches 130 via memory interfaces 140. Memory interfaces 140, in turn, are also connected to main memory (not shown) via buses 142. In addition to being connected to their own processors 110, the L2 caches 130 may also be interconnected to one another via a plurality of bidirectional buses 150 thereby allowing the L2 caches to operate as a single unit having a relatively large amount of L2 cache memory. However, in addition to operating as a single L2 cache, L2 caches 130 are also partitioned (into the four units shown in FIG. 1) so that each processor 110 may be associated with a particular portion of the combined L2 cache. This allows rapid access to any location in the L2 cache memory and results in a faster cycle time. In addition to being connected to their own L1 cache, processors 110 are also interconnected with one another via an interconnection system 160 which is described in detail below.

Figure 2:
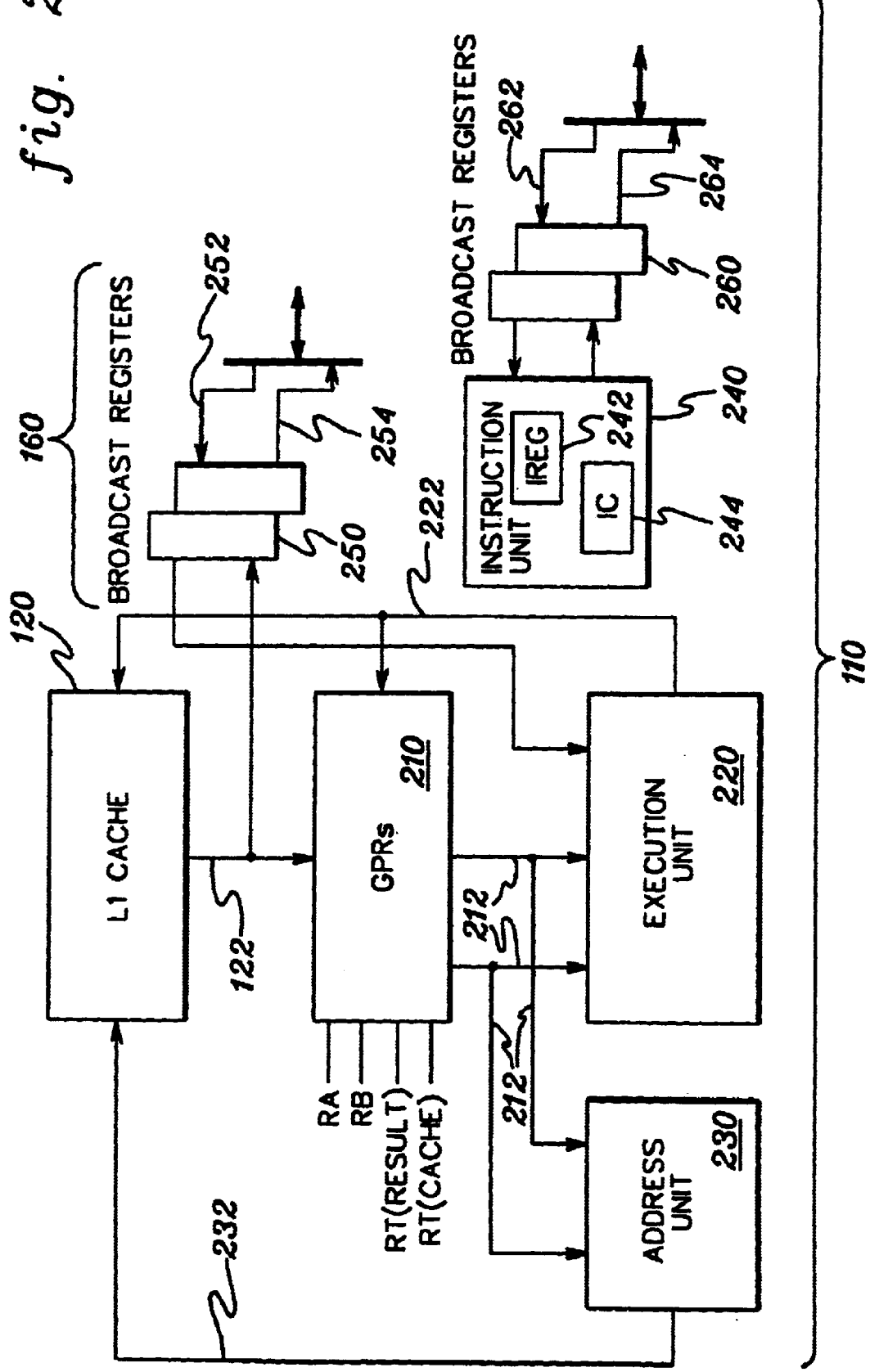
FIG. 2 depicts one example of a portion of the computing system of FIG. 1, in accordance with the principles of the present invention.

FIG. 2 depicts one processor 110 and its associated portion of interconnect system 160 as well as with its associated L1 cache 120. Each processor 110 includes a plurality of general purpose registers (GPRS) 210, an execution unit 220, an address unit 230, and an instruction unit 240. In addition, associated with each processor 110 are a plurality of data broadcast registers 250 and a plurality of instruction broadcast registers 260.

As will be evident to one skilled in the art, any number of GPRs 210, for example sixteen, may be included with each processor. Each GPR may be used for a variety of purposes. For example, one or more GPRs may be used as address registers and are designated as such by a RB field of a single address register instruction and as RB and RA fields of a multiple address register instruction. Likewise, for purposes of describing the present invention, the GPRs may be used as target registers (i.e., a destination for data after performing an operation) and are designated as such by a RT field (which in some architectures is the same as a RA) of an instruction which updates registers either upon fetching data from memory (i.e., RT cache) or upon completion of an operation in the execution unit (i.e., RT result). In addition, the contents contained in the GPRs may be used as operands or as addresses. Finally, it should also be noted that there are a wide variety of execution architectures known to those skilled in the art and that an equally wide variety of nomenclatures may be used to describe the various functions of the GPRs.

In accordance with one embodiment of the present invention, each GPR of each processor is associated with a corresponding GPR in the other processors. Furthermore, these corresponding GPRs of each processor may be forked or joined, such that, when joined, the associated GPRs contain identical copies of the same data fetched from a single source, and when forked, the GPRs contain separate data fetched individually by a local processor.

Typically speaking, instruction unit 240 includes instruction register 242 and instruction counter (IC) 244. In operation, instructions are fetched from memory according to a location referenced by instruction counter 244. The fetched instructions are then latched to instruction register 242 which then allows its processor to execute the fetched instruction utilizing RB and RA as mentioned above.

L1 cache 120 is arranged so that information may be fetched therefrom and stored to GPRs 210 via bus 122. From there, the information stored in GPRs 210 may be transmitted, via buses 212, to address unit 230 and used in the calculation of an address, or to execution unit 220 where an operation is performed. The result of the address calculation performed in address unit 230 is stored in L1 cache 120 via bus 232. The result of the operation performed in execution unit 220, on the other hand, may be stored back to GPRs 210 or alternatively to L1 cache 120 via bus 222.

In addition to fetching information from L1 cache 120 to store in GPRs 210 or to present as input to execution unit 220, information may also be fetched from broadcast registers 250 via bus 256. As will be explained below, information received in this manner originates from data broadcast registers of other processors via bus 252. Similarly, information stored locally may also be transmitted or broadcast from L1 cache 120 to the other processors by way of data broadcast registers 250 via bus 254. Like the data broadcast registers 250, instruction broadcast registers 260 may also be used to broadcast instructions received locally from instruction unit 240 via bus 264, as well as to receive instructions broadcast by the other processors via bus 262.

Figure 3:
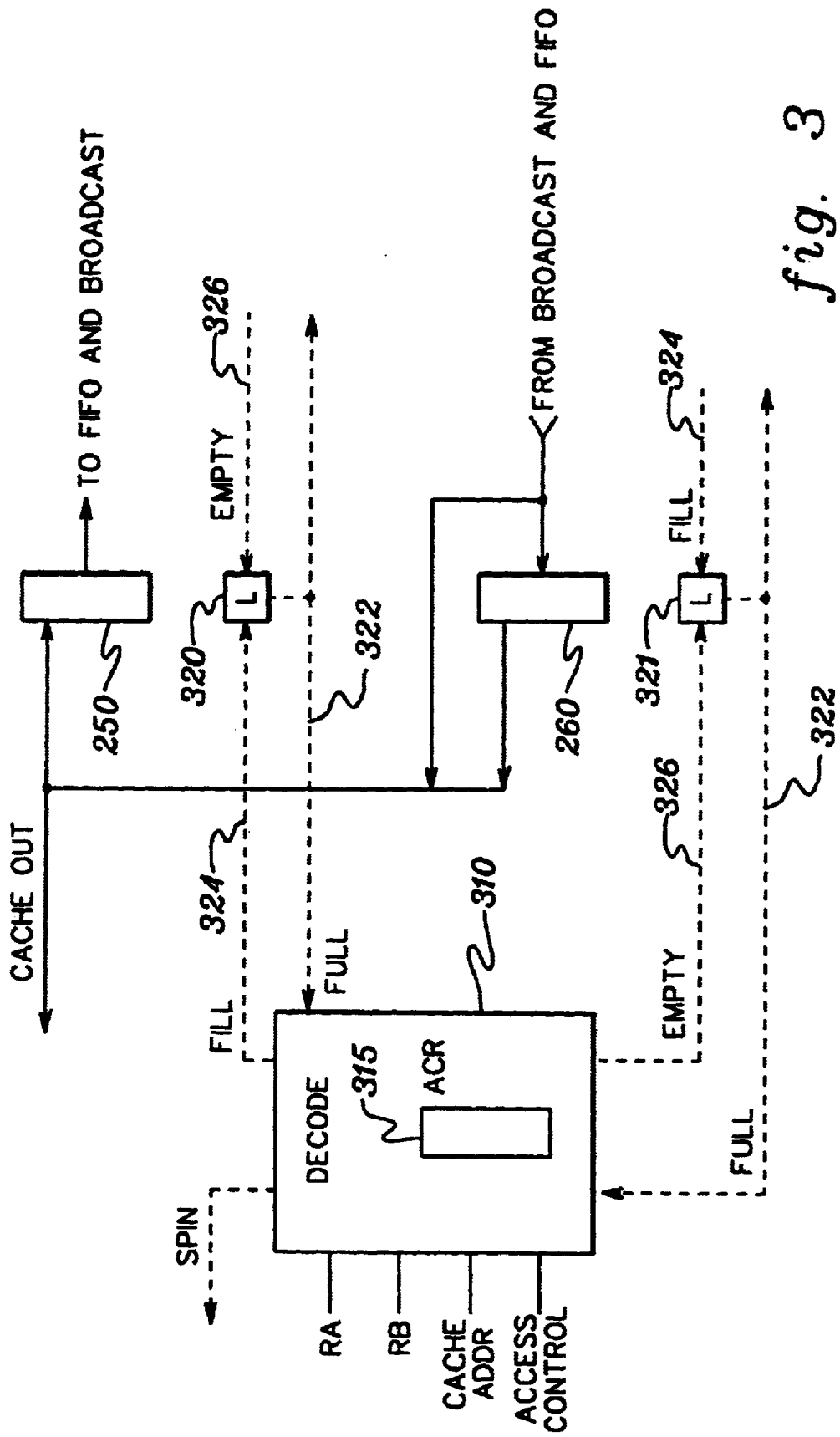
FIG. 3 depicts one example of a portion of a processor depicted in FIGS. 1 and 2, in accordance with the principles of the present invention.

In accordance with one aspect of the present invention, information broadcast from one processor to the other processors is facilitated by the broadcast registers in a first-in, first out (FIFO) manner. Referring to FIG. 3, a portion of a single processor 110 is depicted with a decoder 310 which includes an access control register 315. Decoder 310 is connected to latches 320 and 321 which, as shown in FIG. 3, are respectively associated with broadcast registers 250 and 260.

Latches 320 and 321 indicate whether their respective broadcast registers are empty or full via buses 322 to the decoders of each of the processors. Hence, storing a data word into broadcast register 260 sets or flips latch 321, via bus 324, to indicate to the decoder of each processor that information is currently being held in broadcast register 260. In response, each decoder refrains from storing information to that broadcast register. In a similar manner, when information is retrieved from a broadcast register, thereby emptying that broadcast register, the respective latch is flipped or reset, via bus 326, to indicate to the decoders that this broadcast register is empty and ready to receive information. In response to the above, the decoders do not attempt to retrieve information from the empty broadcast register. By utilizing latches 320 and 321 in this manner and by arranging broadcast registers 250, 260 in this pipe or pipeline-like manner, information may be broadcast from one processor to the remaining processors in a FIFO manner.

In accordance with one aspect of the present invention, and as will be discussed below, computing system 100 may operate in any of single instruction stream single data stream (SISD), single instruction stream multiple data stream (SIMD) or multiple instruction stream multiple data stream (MIMD) modes according to operation of and flow of information between processors 110. For instance, in SISD mode a single instruction, fetched by a local processor and broadcast to the other processors, is executed by all processors on a single piece of data, which is also fetched locally and broadcast to the other processors. In contrast, in SIMD mode a single instruction fetched by a local processor and broadcast to the other processors, is executed by each processor on its own local data fetched by itself. Finally, in MIMD mode, each of the processors fetches its own instruction and then executes this instruction on its own local data.

As will explained below with reference to FIG. 3, the operation of each of the processors 110 as well as the components associated therewith are controlled by inputs received from the instructions fetched from memory (i.e., the values of RB, RA and RT) and according to access control register 315. More specifically, a typical instruction fetched from memory includes a reference to a RB (and with some instructions, a reference to a RA) and a RT, and these references are used to set access control register 315. The particular bits in access control register 315, in turn, dictate whether data or instructions are to be retrieved locally or from a remote portion of memory, and whether data and instructions are to be transmitted for processing at another processor or are to be processed locally.

Access control register 315 is set on an instruction-by-instruction basis to control the use and updating of GPRs 210. In particular, access control register 315 includes two bits for each GPR except for a lone GPR (e.g., GPR 0) which instead is associated with a single bit of access control register 315. Similarly, instruction counter 244 is also associated with a single bit of access control register 315.

Operation of GPRs 210 are dictated by the values stored in access control register 315. For example, a 0 stored in the ACR bit associated with IC 244 indicates that the instruction streams are forked (i.e., each processor of the system fetches its own instruction stream). A 1 stored in the ACR bit associated with IC 244, on the other hand, indicates that the instruction streams are joined (i.e., a single processor fetches an instruction and broadcasts the instruction to the instruction units of the remaining processors). In a similar manner, referring to FIGS. 4a and 4b, the two bits of the ACR associated with GPRs 210 indicate that the registers are forked when set to 00, and joined when set to 01. Setting the high order bit of the ACR GPR bits to 1 can, in certain situations (i.e., when the IC register is joined or the ACR bit associated with the IC is set to 1) force an interleave to local memory.

As to the interleave scheme of the present invention, each L1 is local to a L2, which in turn is local to a memory. In operation, computing system 100 provides for L1 misses to access any L2 or any memory. However, even though L1 misses may access any L2 or any memory, accesses to a local L2 or local memory are faster and are therefore preferred. Division of memory in this manner is referred to as being interleaved.

When memory is interleaved, a subset of the memory address bits (e.g., the page bits of the address) are used to determine which memory is to be accessed. For example, the twelfth and the thirteenth bits from the right end of an address may be used as the interleave bits.

By forcing an interleave to local memory, each GPR fetches data from local memory. Specifically, an instruction, for example, a load forked address instruction (LFA), which is described below, inserts a local processor identifier (ID) into interleave bits of an address generated by each GPR. This forces each GPR to fetch from its own local memory. For instance, forcing interleave causes the interleave bits of addresses generated from GPRs belonging to processor 01 to be forced to 01. This causes the fetches of processor 01 to be made from its local memory, or in other words L2 cache 01. Thus when an interleave to memory is forced, processor 00 is forced to fetch from memory local to L2 cache 00, or interleave 00, and similarly, processor 01 is forced to fetch from memory local to L2 cache 01, or interleave 01.

To further illustrate, when a GPR is joined and when the interleave bits of a memory address are 00, the processor having an ID of 00 will fetch from its local cache and from its local memory. The execution of a LFA RT, RB instruction sets the ACR bits of the RT to 10. Subsequently, when the RT is used as a RB, because its ACR bits were previously set to 10, the GPR will result in a forked fetch causing all processors to fetch their own data, and will also cause the address generator to force the generated address to be local. That is, the address generated by each processor will be forced to match a local memory interleave address. Subsequent forked fetches need not be local, but remote fetches will have longer miss times. Also, fetching from nonlocal memory in forked mode may cause contention for memory interfaces if the processors try to fetch from the same memory location. However, this allows the forked processors to act as a standard shared memory multiprocessor or SMP.

Transition between the various states of operation occur in response to the particular instructions fetched from memory and in response to the settings of the bits in ACR 315. Referring to FIG. 4b, when the ACR IC bit is set to 0 (indicating that there are multiple instruction streams) and when the ACR bits for a particular GPR (ACR GPR) are set to 00 (indicating that the GPRs are forked), separate addresses are generated from the GPRs which, in turn, are used independently by each processor to access memory. Because each processor generates its own address, no broadcast occurs. After generating the addresses, the addresses are stored individually to the respective target. registers. At that point, the ACR bits associated with the target registers are set to 00 indicating that the target registers are forked and that each processor has an independently loaded RT. Furthermore, if the instruction executed was a branch instruction, the ACR IC bit is updated to 0 indicating forked or multiple instruction streams.

When the ACR IC bit is set to 0 (indicating that there are multiple instruction streams) and when the ACR bits for a particular GPR are set to 01 (indicating that the GPRs are joined), a single address is generated from the GPRs. If the instruction is a load instruction, the address will be generated from local memory. If the instruction is a branch instruction, the instruction will indicate which processor is to generate the address according to a processor ID contained in the instruction. This address is then broadcast to the remaining processors. Subsequently, the ACR bits associated with the target registers are set to 00 indicating that the target registers are forked. Furthermore, if the instruction executed was a branch instruction, the ACR IC bit is updated to 1 indicating a joined or single instruction stream requiring the results to be broadcast.

When the ACR IC bit is set to 1 (indicating that there is a single instruction stream) and when the ACR bits for a particular GPR are set to 00 (indicating that the GPRs are forked), separate addresses are generated from the GPRs which are, in turn, used independently by each processor to access memory. Because each processor generates its own address, no broadcast occurs. After generating the addresses, the addresses are stored individually to the respective target registers. At that point, the ACR bits associated with the target registers are set to 00 indicating that the target registers are forked. Furthermore, if the instruction executed was a branch instruction, the ACR IC bit is updated to 0 indicating forked or multiple instruction streams.

When the ACR IC bit is set to 1 (indicating a single instruction stream) and when the ACR bits for a particular GPR (ACR GPR) are set to 01 (indicating that the GPRs are joined), a single address is generated from the GPRs. In this case, since the address registers are joined, a processor indicated by the instruction via a processor ID match will generate the address. The resulting address is then broadcast to the other processors. Subsequently, the ACR bits associated with the target registers are set to 01 indicating that the target registers are joined. Furthermore, if the instruction executed was a branch instruction, the ACR IC bit will be updated to 1 indicating that there is a single instruction stream requiring the results to be broadcast.

When the ACR IC bit is set to 1 (indicating a single instruction stream) and when the ACR bits for a particular GPR are set to 10 (indicating the forcing of an interleave to local memory), each processor generates its own address, with the address generated being forced to local memory according to the interleave scheme described above (i.e., processor 01 is forced to interleave 01; processor 10 is forced to interleave 10; etc.). By doing so, a SISD program with joined GPRs can be forked to start operation in a SIMD mode. Subsequently, the ACR bits associated the target registers are set to 00 indicating that they are forked. Further, if the instruction executed is a branch instruction, the ACR IC bit is updated to 0.

Next, it should be noted that certain states are either reserved or result in errors and, consequently, are not further discussed. These include the following: 1) ACR IC=0, ACR RB=01; 2) ACR IC=0, ACR RB=11; and 3) ACR IC=1, ACR RB=11.

In accordance with one aspect of the present invention, a Load Forked Address (LFA) instruction causes data to be fetched locally and then subsequently broadcast. In particular, the interleave bits contained in the instruction are used to determine which processor fetches. In this regard, the processor local to the memory indicated by the interleave bits fetches and broadcasts to the remaining processors. After broadcast, the ACR bits for the target registers are set to 10. As discussed above, subsequent use of a register having ACR bits associated therewith set to 10 causes a transition from SISD mode to SIMD mode.

A Load Joined Address (LJA) instruction, in contrast to the LFA instruction, causes a GPR's ACR bits to be set to 01. When the LJA instruction is executed, data is fetched locally and broadcast by processor 00. Then, the ACR for the target GPR is set to 01. Subsequent use of that register as an address register results in a fetch and broadcast by the processor local to the address loaded. In this manner, operation in SIMD mode with forked GPRs is shifted to SISD mode with joined GPRs.

A branch at barrier instruction synchronizes the individual processors. More particularly, this instruction causes individually executing processors to temporarily cease processing, at a barrier, and subsequently wait for the remaining processors to also arrive at that barrier. Furthermore, the processors at the barrier are allowed to wait only a limited amount of time (i.e., a timeout period) for the other processors. At the end of the timeout period, assuming that at least one processor has not arrived at the barrier, an error is generated. On the other hand, assuming that all of the processors arrive at the barrier before the timeout, the instruction streams are joined by setting the ACR bit of the IC to 1. In this manner, operation of the system may be switched from multiple instruction streams to a single instruction stream.

Another process for joining instruction streams includes executing a branch instruction with joined base registers. This technique is described in greater detail below, with reference to FIG. 6.

Figure 5:
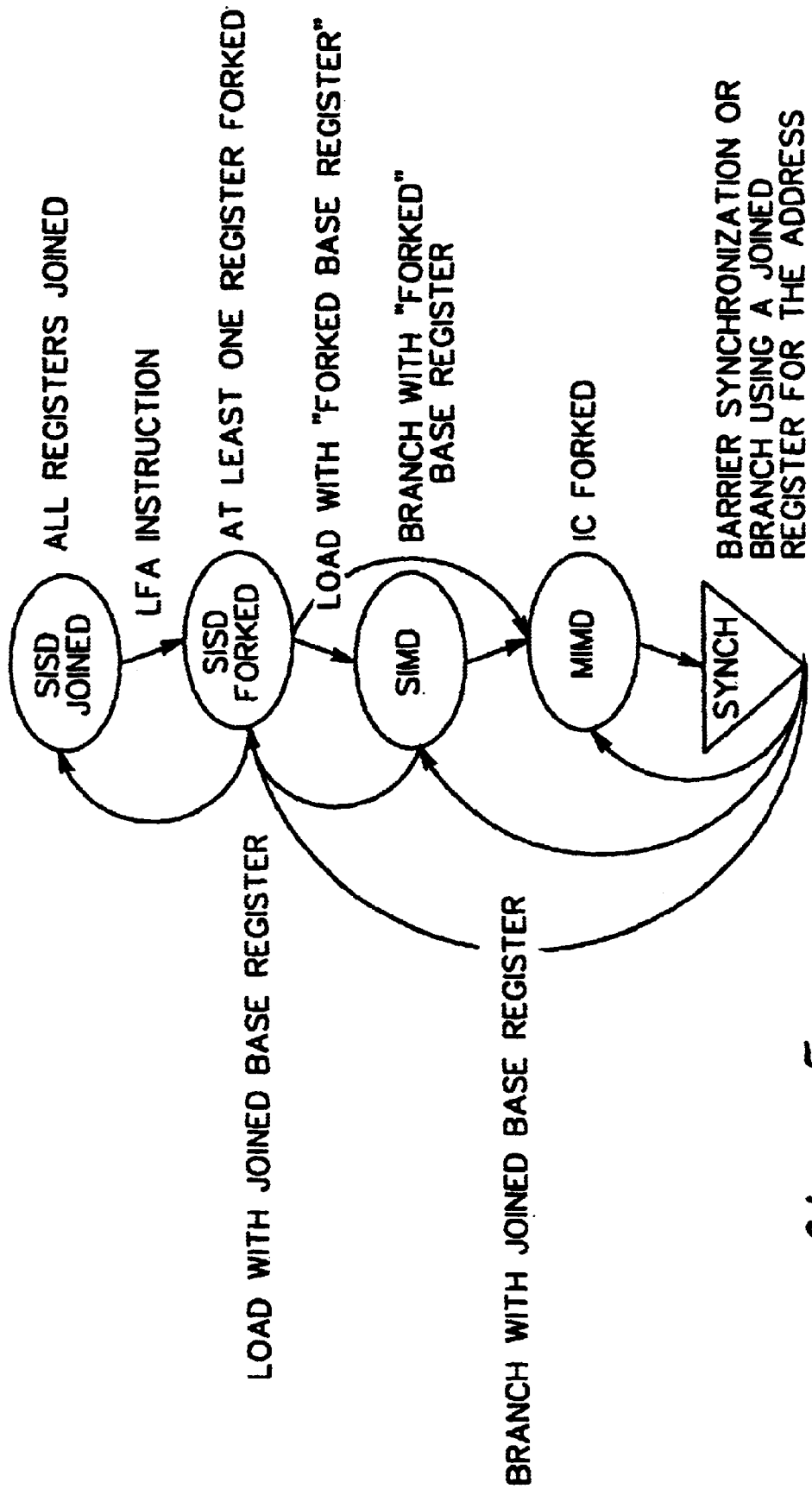
FIG. 5 describes various operating states of the computing system of FIG. 1, in accordance with the principles of the present invention.

Referring to FIG. 5, the various machine states (i.e., SISD, SIMD and MIMD modes) and their relation to one another are described. In the SISD joined mode, computing system 100 operates in the uniprocessor mode. In this mode, each GPR in a processor is joined with its corresponding GPR in the remaining processors. In operation, a single instruction stream is executed by the processors. Specifically, a processor local to the instruction stream and data stream fetches from memory and executes the instruction. Thus, the addresses of the instruction and of the data dictate which processor accesses memory. When the addresses shift out of range of a particular processor, a different processor commences operation. As a result, a single processor in the system operates at any given time.

Transition may be made from SISD joined mode to SISD forked mode by execution of the Load Forked Address instruction. As discussed above, this instruction forks the joined registers by setting the ACR bits associated with a GPR to 10. After forking, the GPRs act independently and generate addresses according to the interleave scheme of the present invention.

Operation of the system shifts or transitions from SISD mode to. SIMD mode by actually using a forked register. For instance, loading a register forked by the LFA instruction, as discussed above, causes each processor to fetch data independently. In SIMD mode a single instruction stream is executed by the processors (i.e., an instruction is fetched by a local processor and broadcast to the other processors) using data fetched by each processor from its own local portion of memory. Thus, each processor receives the same instruction, but operates on different data elements.

To return to SISD mode from SIMD mode, a LJA instruction may be performed. With this instruction, processor 00 performs a fetch and broadcasts to the remaining processors. The other processors store the broadcast data into their target register, thereby joining these registers. Additionally, the ACR bits associated with this GPR are also set to 01 indicating a joined state.

While operating in SIMD or SISD forked mode, executing a branch instruction with a forked RB splits the processors. This switches operation into MIMD mode and allows each processor to execute its own instruction stream using data fetched independently. In MIMD mode, each of the processors fetches its own instruction and then executes this instruction on its own local data. Hence, each processor is independent and operates on its own instructions and on its own data.

Figure 6:
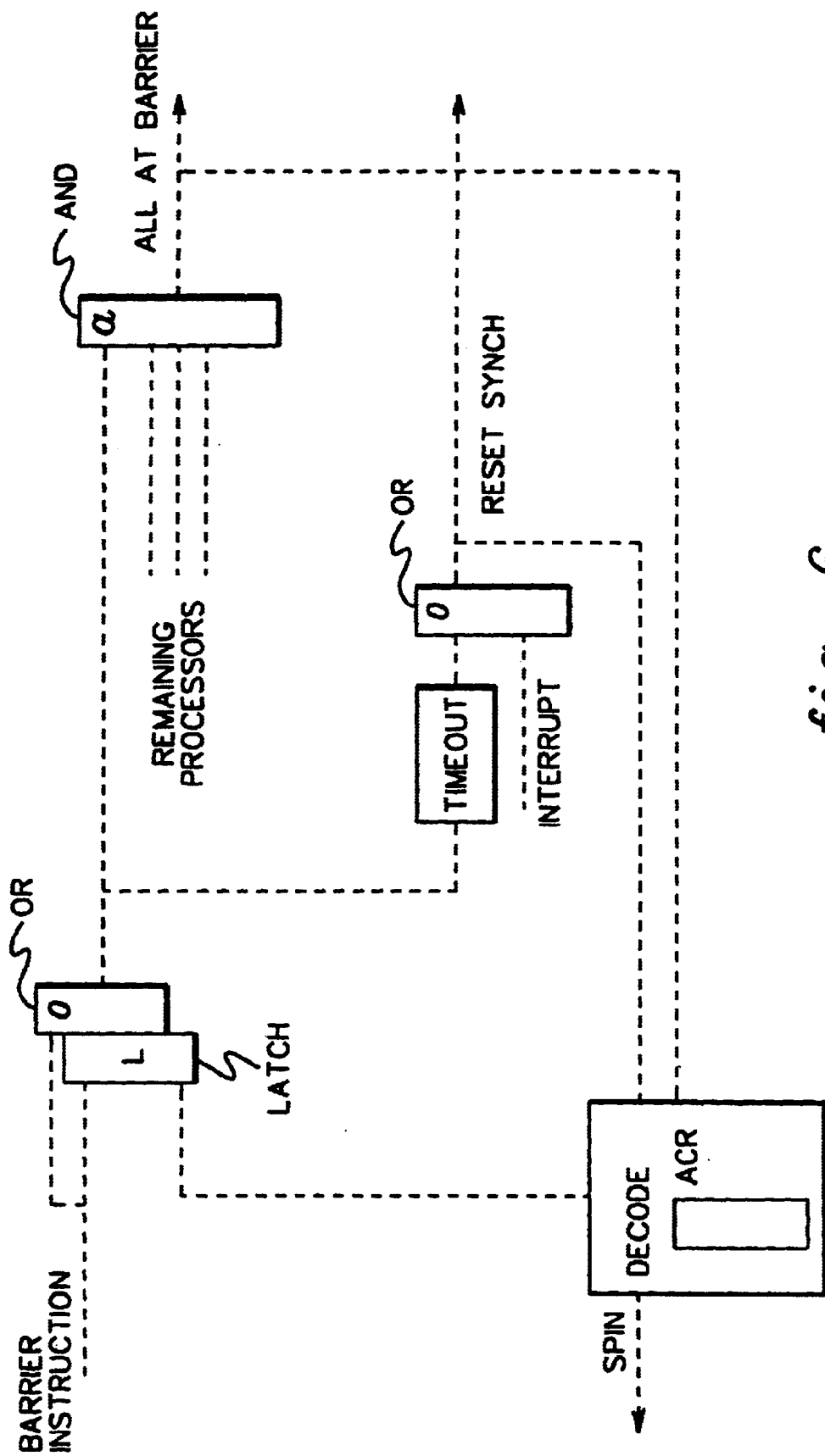
FIG. 6 depicts one example of a portion of the computing system of FIG. 1 utilized for implementing a barrier synchronization, in accordance with the principles of the present invention.

To exit MIMD mode a barrier synchronization using the branch at barrier instruction is performed. Referring to FIG. 6, a barrier instruction is read resulting in a barrier synchronization. The processor receiving the instruction spins, or pauses and refrains from processing, until a result or update regarding the other processors is received. The result will be, for example, −1 if a timeout or an interrupt occurs before all engines reach the barrier. A zero, for example, is returned if all engines reach the barrier within the timeout. At this point, the ACR bit of the IC is set to 1 indicating a single instruction stream.

Figure 7A:
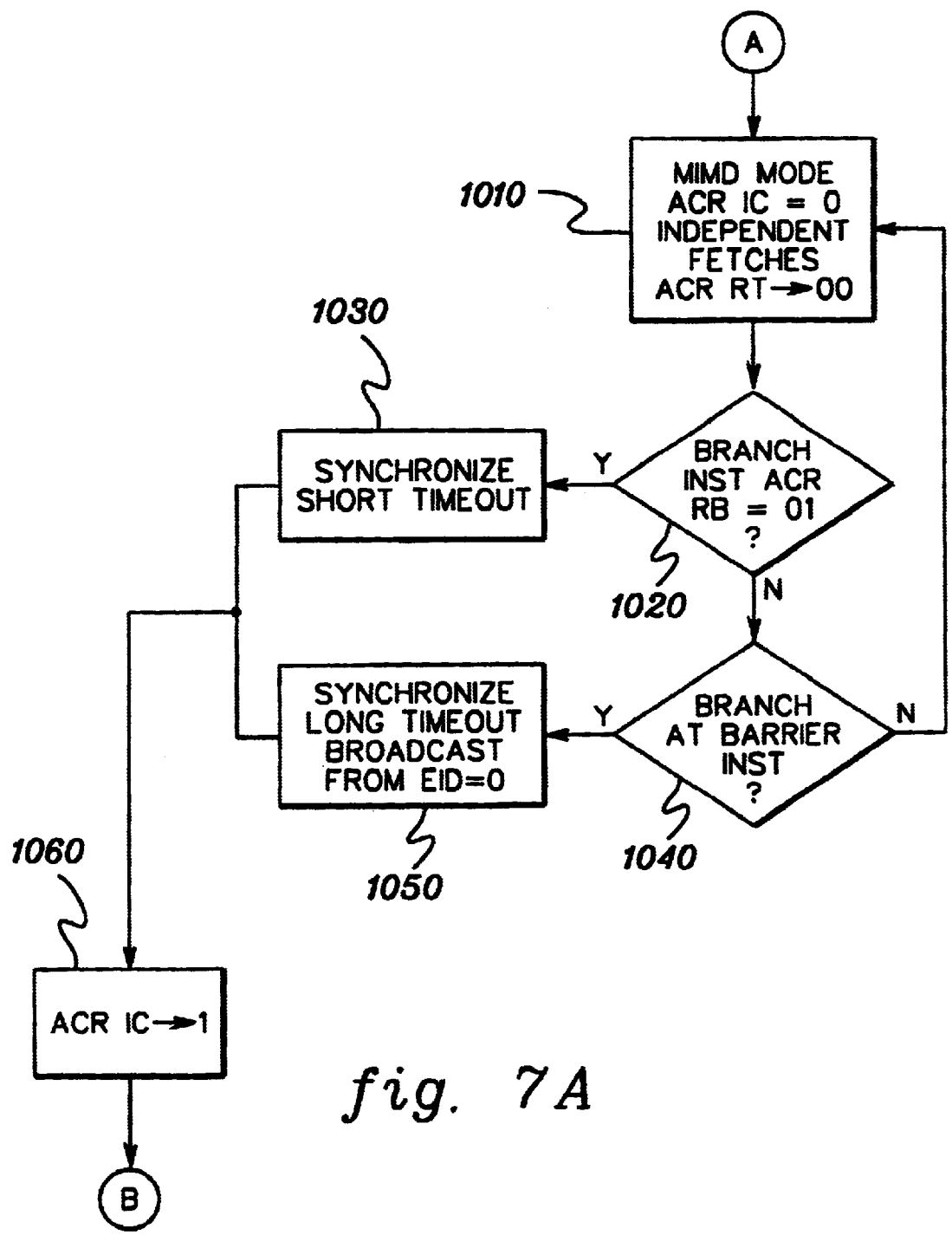
FIGS. 7A and 7B depict one example of logic utilized by the computing system of FIG. 1 for switching between uniprocessor mode and parallel processing mode.
Figure 7B:
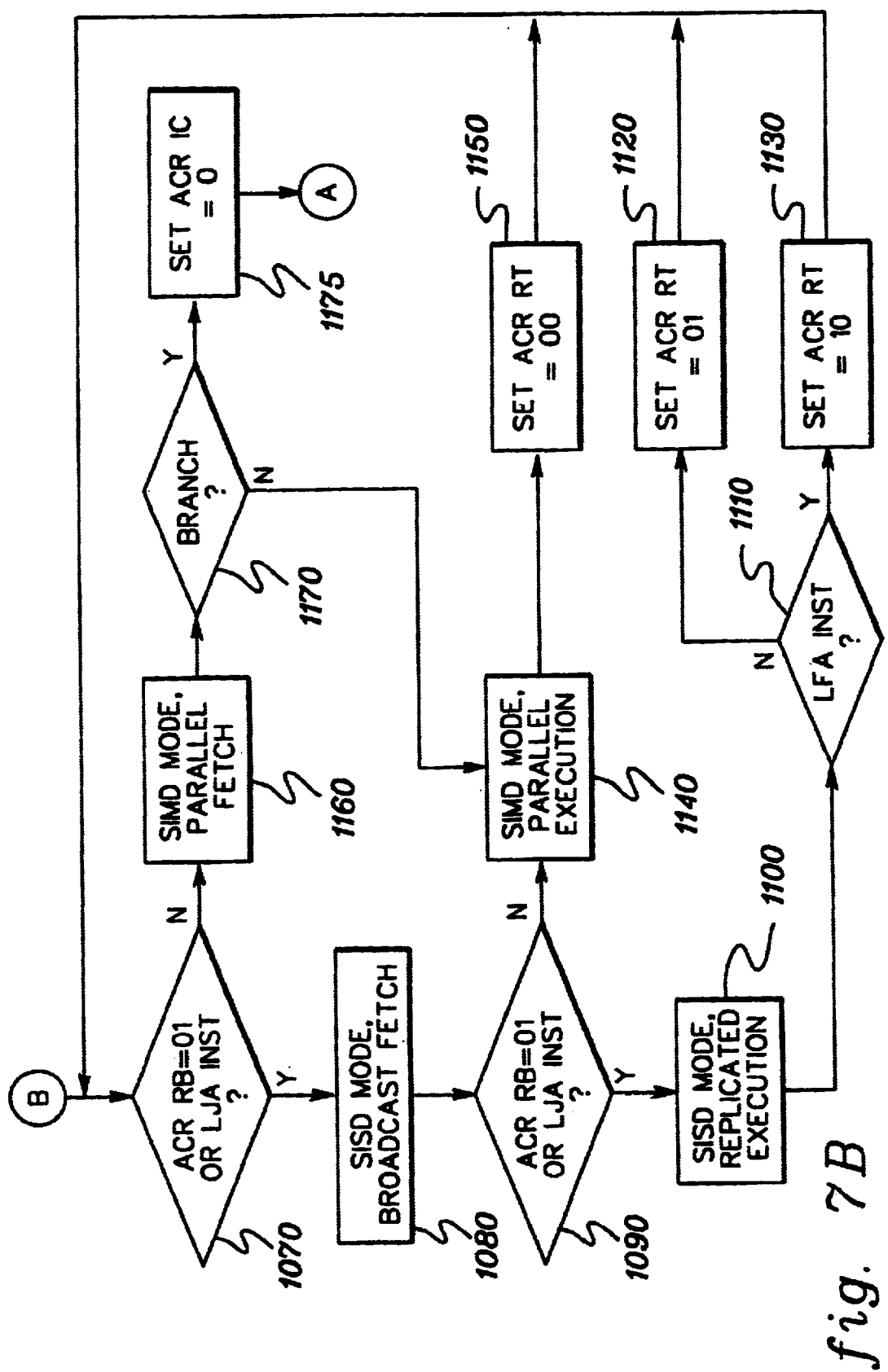

Operation of computing system 100 is now discussed in detail with reference to FIG. 7. Typically speaking, computing system 100 commences operation in MIMD mode 1010. During MIMD mode, the ACR IC bit is set to 0 and the ACR RT bits are set to 00. As a result, each processor operates independently by fetching its own instructions and by executing these instructions on locally fetched data.

During execution in this mode, operation can be shifted from MIMD mode by performing a synchronization or, in other words, by synchronizing operation of the individual processors. In this regard, two circumstances typically cause synchronization. First, a branch instruction 1020 executed on a joined GPR (i.e., ACR bits set to 01) can cause synchronization 1030. In this case, a relatively short timeout is provided for synchronization before returning an error.

In the alternative, a branch at barrier instruction 1040, can also result in synchronization via a broadcast from engine 0, 1050. As discussed above, this instruction allows for a longer timeout period for the processors to synchronize. When synchronized, an arbitrary processor, in this instance engine 00 fetches an instruction and broadcasts to the remaining processors, hence joining the instruction stream.

In the absence of a synchronization event from, for example, the branch instruction performed with a joined GPR or the branch at barrier instruction, processing continues in MIMD mode 1010.

If synchronization is effected, the ACR bit of the IC is set to 1 thereby joining the instruction streams 1060. At that point, processing continues in either SIMD mode or SISD mode according to the state of the RB or according to whether a LJA instruction is fetched 1070. More specifically, if either a LJA instruction is fetched or a joined GPR (ACR bits set to 01) is utilized, processing continues in SISD mode 1080.

In SISD mode 1080, a single instruction is fetched and executed. Similarly, a single data stream is executed by the processors. Thus, as described above, a processor local to the instruction stream and to the data stream fetches from memory and executes the instruction as dictated by the interleave scheme of the present invention.

Subsequently at step 1090, whether the ACR bits associated with a RA are set to 01, indicating that it is joined, and whether a LJA instruction is fetched dictate whether processing continues in SISD mode with replicated execution 1100 or SIMD mode with parallel execution 1140. In particular, when a RA is joined or when a LJA instruction is executed, processing continues in SISD mode with replicated execution 1100, or, that is, operation in a uniprocessor mode with each processor performing the same operation and storing the same result in RT. In contrast, when an instruction other than a LJA instruction is executed processing in SIMD mode with parallel execution commences 1140.

From SISD mode with replicated execution 1100, operation may remain in SISD mode if an instruction fetched is not a LFA instruction 1110. In particular, if a fetched instruction is not a LFA instruction, the ACR associated with the RT is set to 01, at 1120, in which case the GPR is joined and in which case processing continues in SISD mode.

If, on the other hand, a LFA instruction is fetched, the ACR associated with the RT is set to 10, at 1130. In this case, the next use of this GPR will result in a SIMD operation which would then cause additional GPRs to fork or split instruction into multiple instruction streams causing a transition to MIMD mode.

On the other hand, at step 1090, if a LJA instruction is not fetched and if a RA that is not joined is utilized (i.e., as dictated by having its ACR bits set to 10 or 00), instead of processing in SISD mode 1100, processing continues in SIMD mode with parallel execution 1140. In this case, the ACR bits associated with the RT are set to 00, at 1150, indicating that RT is now forked containing different data fetched or generated independently by each processor.

Returning to step 1070, if the GPRs used to generate an address are not joined (i.e., if the ACR bits associated with this RB are set to something other than 01) or if some instruction other than a LJA instruction is fetched, instead of entering SISD mode, processing will continue in SIMD mode with parallel fetches 1160. In this case, each processor fetches its own data.

From SIMD mode with parallel fetches 1160, a branch instruction, at 1170, forks the instruction stream, and indication of such is made by setting the ACR bit of the IC to 0, at 1180. By forking the instruction stream, processing subsequently returns to MIMD mode 1010.

If an instruction other than a branch instruction is fetched, at 1170, processing continues in SIMD mode 1140 with parallel execution, as discussed above.

Described above are techniques and mechanisms for operating a computing system by relying on joining and forking registers. More specifically, when joined, the registers contain a same piece of information. In contrast, when forked, the registers contain different pieces of information. By allowing the registers to switch from joined to forked modes, the computing system may rapidly and efficiently switch between multiple modes of operation. Furthermore, the present invention also provides for a higher memory bandwidth and a larger, faster cache through the partitioning of memory and through the fetching and broadcasting of information by a processor local to a particular memory section.

Figure 8:
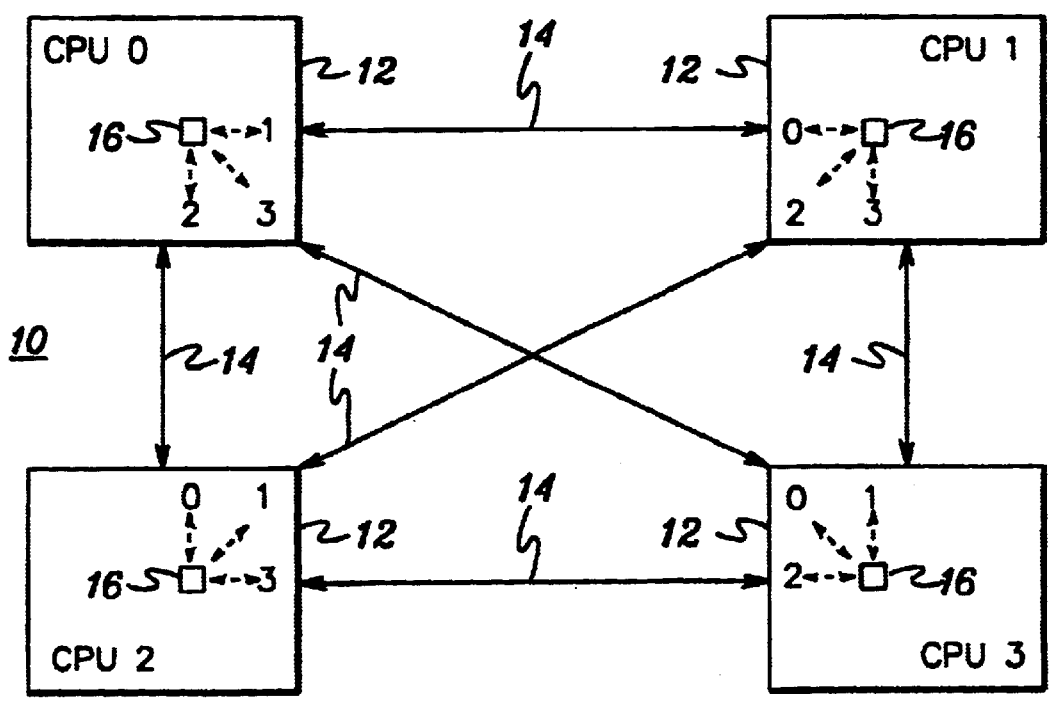
FIG. 8 depicts one example of a multiprocessor computer system wherein CPU processing engines are interlinked by multiple direct register pipes, in accordance with the principles of the present invention.

FIG. 8 depicts one embodiment of a multiprocessor computing system, generally denoted 10, implementing a register pipes capability in accordance with one aspect of the present invention. In this embodiment, four processing engines 12, labeled CPU 0, CPU 1, CPU 2 & CPU 3, are fully and directly interconnected using register pipes 14 pursuant to the present invention. Each enabled register pipe is identified by the pair of CPU IDs that the pipe connects. For example, the connection between CPU 1 and CPU 2 would be known by the tuple (1,2). Each CPU has identified therein a number for each register pipe 14 which is representative of the CPU also connected to that particular pipe. A fully connected set of n CPUs has n(n−1)/2 possible direct pipe connections. Note that the CPUs depicted in this figure are only one example of processing engines which can be interconnected using register pipes in accordance with the principles of the present invention.

As presented herein, a register pipe can be constructed in one embodiment by mapping general purpose registers (GPRs) to the pipe to be implemented, thereby connecting two processing engines. Each processor in the multiprocessor computer system conventionally has multiple general purpose registers, for example, 16 GPRs may be provided in a typical architecture. By way of example, reference the initially-presented discussion of a uniprocessor implementation of four processing engines. By mapping a general purpose register to a particular pipe, then whenever an instruction points to that particular GPR, the pipe is employed assuming that the pipe is enabled at the time.

Each enabled pipe can be addressed as a GPR whose low order address bits match the CPU ID of the processing engine to which the pipe is connected. In a 16 GPR machine, the pipe between, for example, CPU 1 and CPU 2 can be addressed as GPR xx10 in CPU 1 and as xx01 in CPU 2. Since only one GPR is needed to map to the pipe, xx can be arbitrary and by convention set to 11 in one example. GPR mapping allows a pipe to be the source or target register of any instruction. To fully implement register pipes between four processing engines as shown, four GPRs would be needed within each processor. Note that in a 16 GPR embodiment, this still leaves 8 GPRs for other processings.

Pursuant to the present invention, a fourth GPR address, labeled 16 in FIG. 8, can be employed as a radiating or consolidating pipe address. For example, if data is to be written from one CPU to all other CPUs, then this fourth pipe address might be employed to broadcast the data to all other pipes. Conversely, if data is to be read from all pipes, for example, to facilitate a barrier synchronization function such as discussed above, then this fourth pipe address might be employed. The broadcast/consolidation pipe could be referenced within each processing engine as pipe 00 in one example. Thus, if an instruction writes to pipe 00, the data is broadcast to all other pipes connected to that engine, while if data is read from pipe 00, barrier synchronization is performed.

Figure 9:
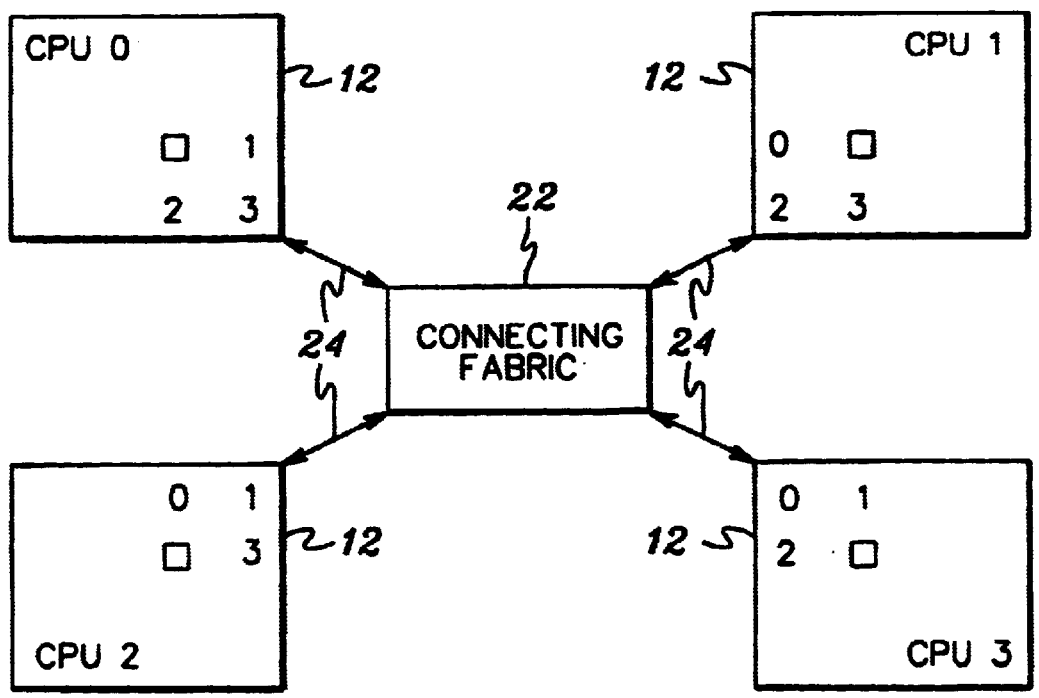
FIG. 9 depicts another example of a multiprocessor computer system wherein CPU processing engines are indirectly linked using register pipes established through a shared connecting fabric, in accordance with the principles of the present invention.

FIG. 9 depicts an alternate embodiment of the present invention wherein a connecting fabric 22 is shared by the processing engines of the multiprocessor computer system. Shared connections 24 couple connecting fabric 22 to each processing engine 12. Those skilled in the art will recognize that there are numerous interconnect topologies which could be employed. By way of example, the connecting fabric could comprise any interconnect structure, such as a ring, network, mesh or fully connected switch structure.

Common to the embodiment of FIG. 8 is that within each processing engine registers are selectively mapped to create the desired pipe register. In one embodiment, this mapping of pipes can be dynamic in that a register pipe may be selectively enabled during processing of instructions. The CPU ID tuples can be employed to route data through the common fabric or switch, thus avoiding costs associated with direct register pipes as the number (n) of CPUs grows. This can be significant since the number of pipes needed to fully interconnect a multiprocessing system grows with $n^2$. In one embodiment, the destination CPU ID can be used to control the fabric and target CPU ID can be used to identify at the destination the pipe the arriving data is from. For low levels of scaling, the fully connected network of FIG. 8 allows the fastest and simplest operation, while for higher levels, the embodiment of FIG. 9 may be more practical.

In one simple implementation of a processor with general purpose registers, there is one copy of the general purpose registers and a single execution unit which accesses them based on register pointer fields within executed instructions. The register pipe concept described hereinabove has been depicted using such an architecture for purposes of example. However, those skilled in the art should note that the concepts of the present invention could be readily extended to more complex architectures.

Further, for clarity it is assumed that each pipe is implemented using four registers. For example, the pipe (0,1) is assumed as implemented by an out reg at CPU 0 feeding an in reg at CPU 1 along with an out reg at CPU 1 feeding an in reg at CPU 0 (see FIGS. 10–12 below). When register mapping, the in reg and out reg are each mapped to a GPR in the CPU where they reside. That is, when pipe (0,1) is enabled, a write to GPR xx01 in CPU 0 gets written to the in reg associated with pipe (0,1). Similarly, a read from GPR xx01 takes the data from the out reg associated with pipe (0,1), i.e., when the pipe is enabled.

The physical implementation of the in regs and out regs and GPRs can take several forms. For example, the GPRs and in regs of each processor could be implemented as the GPRs. This would save a separate implementation of the in reg, and also avoid separately saving its contents on context switches. Furthermore, it is possible to architecturally map the out regs of, for example, CPU 1 to the GPRs in CPU 0. In this case, an out reg exists for timing purposes only and is not present architecturally, that is, if the cycle time and wire length and logic speed allow the transfer of data directly from, for example, the CPU 1 execution unit to a GPR in CPU 0 within one cycle.

Implementation of the present invention can be accomplished without physically implementing the out regs and in regs. As a practical matter, this timing situation is unlikely to occur, and the invention is shown as having two cycles of buffering to allow for transfer delays and skew between the instruction streams of the CPUs. This means that data pipes must flush their contents to the target GPRs on a context switch and if out regs are allowed to be written before the GPRs are read, then the out reg must be saved separately. The tradeoff is between increasing the size of the "state" which the CPU must save on a context switch and the ability to stack data in the pipes intermediate the in reg and out reg stages. The more stages of the pipe there are, the more state data has to be saved.

As an alternative embodiment, instructions can be configured to directly access pipes without requiring mapping of general purpose registers. Mapping to registers allows flexible use of pipes by any instruction but causes the mapped GPRs to be dedicated to the pipe connections when the pipes are enabled. Explicit instructions for pipe transfers avoids this cost of GPR mapping. When a new binary instruction architecture is available, an extra bit in the GPR fields can identify use of a pipe instead of a GPR. However, for machines with limited GPR sets and existing instruction architecture constraints, the addition of instructions which explicitly address pipes instead of GPRs will also work. In fact, a few such instructions are often desirable even when register mapping is implemented.

The instructions of primary value would be: load pipe, store from pipe, move register to pipe, and move pipe to register. These instructions would work like normal instructions but would have one of their operand GPR pointers used to address a pipe. In effect, this is using the opcode field of the instruction to do a limited extension of the GPR pointer. Certain operations like add and compare for grand totals and sorts would lend themselves to implementation using subsets of the pipe structure.

For example, machines which do a significant amount of linear algebra often implement a "multiply add" instruction. This instruction performs a multiplication and adds the result to an accumulating register. Consider 16 way vector multiplication. In a single machine there are 16 multiply adds performed. In a machine with 4 processors connected simply in a ring, this can be performed by 4 multiply adds plus 2 piped adds. Without the pipes the 4 way machine would have to perform a store before each final add. (In RISC machines (offered by IBM) this becomes a Store, Load, Add.) Because this involves sharing memory the synchronization overhead is high, so the cost is more than simply adding the instructions.

One embodiment for implementing register pipes in accordance with the principles of the present invention is described below with reference to FIGS. 10–12. As noted above, the register pipe facility of the present invention is a type of register control scheme, for example, for general purpose registers, which allow direct transfer of information from a first processing engine to a second processing engine without requiring that the information pass through main memory of the computer system. In a direct connect embodiment, a register pipe would comprise a first pipe section coupling the first and second processing engines and a second pipe section coupling the first and second processing engines. The first pipe section might comprise an output register in the first processing engine and an input register in the second processing engine, while the second pipe section could comprise an input register in the first processing engine and an output register in the second processing engine.

Figure 10:
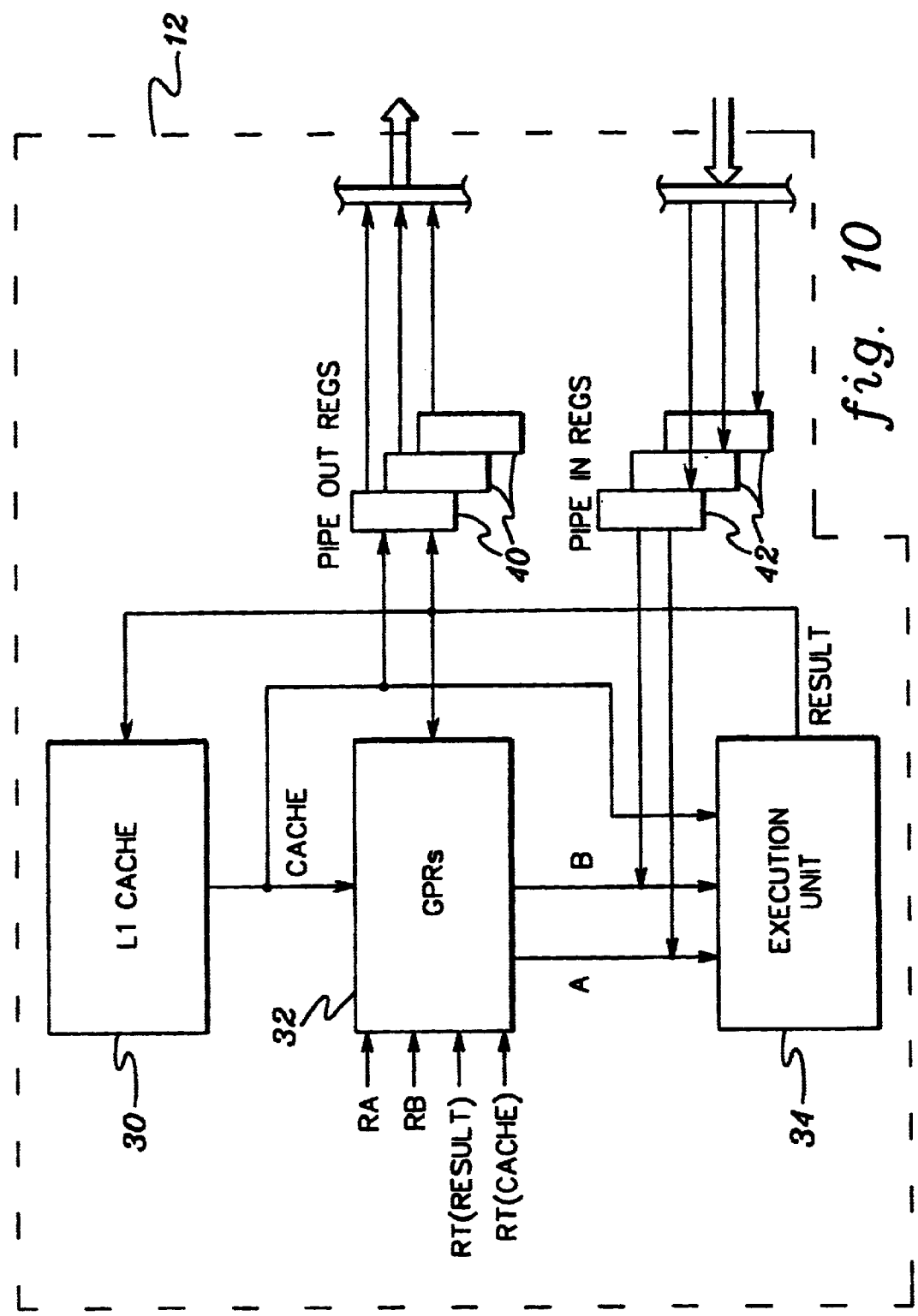
FIG. 10 depicts one example of an L1 cache, general purpose registers (GPRs), execution unit, pipe out registers and pipe in registers within one CPU processing engine of FIGS. 8 or 9, in accordance with the principles of the present invention.

FIG. 10 depicts one embodiment of a processing engine, such as a CPU 12 in a multi-processing computer system. CPU 12 includes an L1 cache 30, GPRs 32 and execution unit 34 which function similar to the description provided above with respect to FIG. 2. In addition, within each processor are pipe out regs 40 and pipe in regs 42, which in one embodiment, are specifically mapped GPRs 32.

As evident to one skilled in the art, any number of GPRs, for example, 16, may be included within each processor. Each GPR may be used for a variety of purposes. For example, one or more GPRs may be used as address registers and designated as such by a RB field of a single address register instruction and as RB and RA fields of a multiple address register instruction. Likewise, for purposes of describing the present invention, the GPRs may be used as target registers (i.e., a destination for data after performing an operation) and are designated as such by a RT field (Which in some architectures is the same as an RA) of the instruction which updates registers either upon fetching data from memory (i.e., RT cache) or upon completion of an operation in the execution unit (i.e., RT result). In addition, the contents contained in the GPRs may be used as operands or as addresses.

L1 cache 30 is arranged so that information may be fetched therefrom and stored to GPRs 32 or forwarded to execution unit 34. In addition, information may be fetched from L1 cache 30 for forwarding to pipe out regs 40 in accordance with the principles of the present invention. Data received from another processor passes through pipe in regs 42 as A and B inputs to execution unit 34. The result of execution unit 34 can be forwarded to L1 cache 30, GPRs 32 or pipe out regs 40 as shown.

In accordance with the principles of the present invention, three output regs are shown to connect to three other processing engines of the multi-processing computer system, along with three pipe in regs 42. Again, the registers are mapped in accordance with this aspect of the present invention so that instead of writing to GPRs, data is written to, for example, the pipe out regs. Alternatively, when data is being read, instead of reading data from the GPRs, data can be read from the pipe in regs. Essentially, each pipe section of a register pipe is a first-in first-out (FIFO) buffer comprised of two registers, i.e., the output register of a first processing engine and the input register of a second processing engine. Once a register pipe is full, the data must be read out at the other end before additional information can be placed into the pipe.

Figure 11:
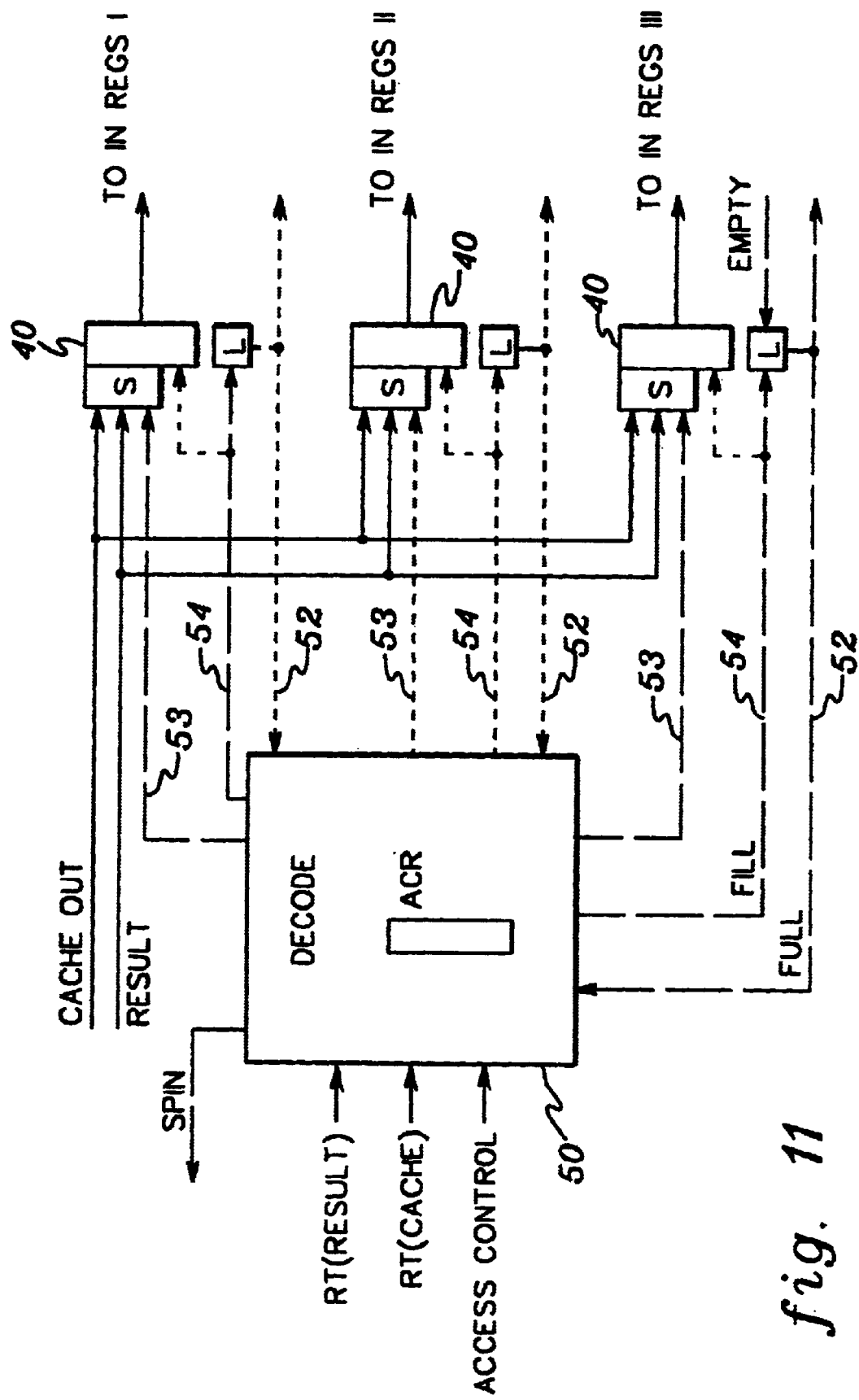
FIG. 11 is a more detailed schematic of one embodiment of the pipe out registers of FIG. 10, in accordance with the principles of the present invention.
Figure 12:
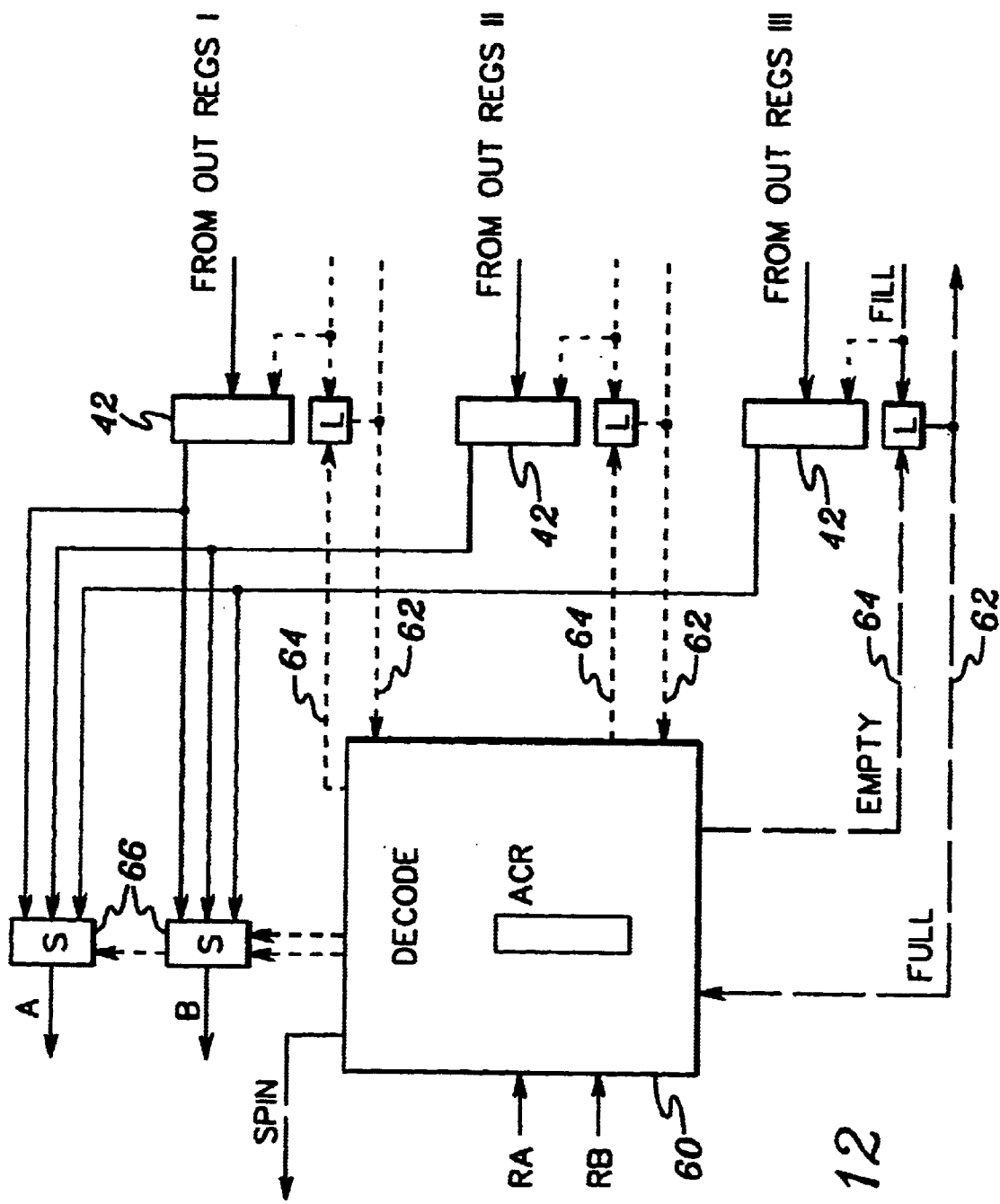
FIG. 12 is a more detailed schematic of one embodiment of the pipe in registers of FIG. 10, in accordance with the principles of the present invention.

FIGS. 11 & 12. depict one embodiment of a control scheme for the pipe output regs and pipe input regs, respectively. Referring first to FIG. 11, three out regs 40 are shown. A selector S is at the input to each pipe out reg 40 for selecting between data from L1 cache 30 (FIG. 10) or a result from execution unit 34 (FIG. 10). A control signal 53 from a decode unit 50 controls which data is to be output.

Decode unit 50 receives as input a result or cache input for the target register (RT) and an access control signal. An access control register (ACR) within the decode unit controls whether particular GPRs are to function as pipe registers or not. A spin signal is output from the decode unit when the register pipe to be employed is full and is waiting to be emptied by the destination processor. A latch is associated with each pipe out reg 40 to control outputting of data through the registers. The latch is controlled by a full signal 52 from decode unit 50. The full signal indicates that there is something in the pipe and that additional data cannot be written until the pipe is emptied. If desired, an alternative embodiment could employ multiple stages to each FIFO. A fill control signal 54 is output from decode unit 50 when data is to be written to a particular pipe out reg 40. Control signal 53 again controls which source the data is to be derived from.

Note that two bits of address are needed in order to address three pipe out regs. Two bits of address provides four address possibilities meaning that there is one extra address. This extra address can be employed as depicted in FIGS. 8 & 9 to either write all pipes, or to synchronize data between all pipes. Thus, a pipe write with RT equal to the processor's own pipe engine ID will cause all three pipe out regs 40 to be loaded. This can cause a serialization between the RT result and RT cache, resulting in a spin or processor wait.

FIG. 12 depicts one embodiment of pipe in regs implemented within each processor of a four processor embodiment of a multiprocessor computer system incorporating register pipes in accordance with the present invention. By way of example, the pipe in registers 42 may receive data from the corresponding pipe out registers of the other processors in the system. A latch is associated with each register for latching data into the register when the source processing engine is filling the register. A full signal 62 is provided by the latch to decode unit 60, as well as returned to the source processor. Decode unit 60 again employs an access control register (ACR) in initiating an empty signal 64 for emptying selected in regs 42, for example, for transmission to execution unit 34 (FIG. 10). Output of each reg 42 is to an input to a first and a second selector S 66. Selectors 66 output data on the A data line and B data line for execution unit 34 (FIG. 10) depending upon whether a read A or read B signal is received by the decode unit.

In one embodiment, the access control register (ACR) contains one bit for each bi-directional connection. This assumes fixed mapping of GPR addresses to connections. A fully connected four-way register pipe thus requires four registers within each processor. Again, self-connection using the extra register address enables either a broadcast to all other processors or a barrier synchronization (described below). Table 1 depicts one example of the access control register states.

TABLE 1

| ACR State | Source (RA or RB) | Target (RT) |
| --- | --- | --- |
| 0 | GPR - Private | GPR - Private |
| 1 | Pipe - Wait for pipe addressed by RA, RB | Pipe - Put result in Pipe addressed by RT |

As noted above, a unique synchronization barrier can be implemented in accordance with the present invention by a processing engine reading from its own pipe address, for example, pipe 16 in FIG. 8. Since three address are needed to fully connect four processors using register pipes, a two-bit addressing scheme allows for an extra pipe address. This extra address is designated the processor's own pipe address and when read initiates a barrier synchronization in accordance with the present invention. Barrier synchronization can be implemented using the hardware depicted in FIG. 6 and described above. However, the present control concept does not involve the instruction stream or the joining of machines together. Rather, when read, the engine's own ID address to a dedicated pipe register 16 (FIG. 8) results in initiation of synchronization with the processing engine initiating the read. The instruction doing the read will spin until a result is available. The result will be −1 if a timeout or interrupt occurs before all processing engines reach the barrier instruction. A 0 is returned if all engines reach the barrier within the timeout limit. The timeout limit may comprise a predefined number of cycles within which synchronization between machines is to occur.

In operation, when an instruction is executed reading from the pipe address of its own processing engine, a latch is set to signal the other processing engines that that engine is at a barrier synchronization. The logic of FIG. 6 is implemented within each processing engine of the multi-processor computer system and when the other processing engines receive the barrier synchronization signal, each initiates synchronization. Note that in the implementation of FIG. 6, the AND gate is assumed common to all processing engines and receives as input the ORed output from the depicted latch within each processing engine.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of theses variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of transferring data between a first processing engine and a second processing engine, said method comprising:

establishing a register pipe between said first processing engine and said second processing engine, said establishing including mapping general purpose registers of said first processing engine to general purpose registers of said second processing engine to establish said register pipe; and transferring data between said first processing engine and said second processing engine using said register pipe, wherein data is transferred between said first and second processing engines without passing through memory.

2. The method of claim 1, wherein said register pipe comprises at least one first register in said first processing engine and at least one second register in said second processing engine.

3. The method of claim 2, wherein said register pipe is bidirectional and wherein said at least one first register comprises a first inlet register and a first outlet register and wherein said at least one second register comprises a second inlet register and a second outlet register.

4. The method of claim 3, wherein said first inlet register, first outlet register, second inlet register and second outlet register comprise general purpose registers.

5. The method of claim 4, wherein said establishing comprises mapping said general purpose registers as said register pipe coupling said first processing engine and said second processing engine.

6. The method of claim 3, wherein said register pipe comprises a first pipe section for transferring data from said first processing engine to said second processing engine, and a second pipe section for transferring data from said second processing engine to said first processing engine, said first pipe section comprising a first first-in, first-out (FIFO) buffer comprising said first outlet register and said second inlet register, and said second pipe section comprising a second FIFO buffer comprising said first inlet register and said second outlet register.

7. The method of claim 6, wherein said transferring comprises filling said first pipe section by writing data to said first outlet register for forwarding to said second processing engine, and emptying said first pipe section by reading data from said first FIFO buffer through said second inlet register whenever said first FIFO buffer is full.

8. The method of claim 6, wherein said transferring comprises filling said second pipe section by writing data to said second outlet register for forwarding to said first processing engine, and emptying said second pipe section by reading data from said second FIFO buffer through said first inlet register whenever said second FIFO buffer is full.

9. The method of claim 1, wherein said first processing engine and said second processing engine are part of a multi-processing engine environment, and wherein said establishing comprises mapping a different register pipe between each pair of at least some pairs of processing engines in said multi-processing engine environment.

10. The method of claim 9, wherein said multi-processing engine environment comprises four processing engines, said four processing engines comprising said first processing engine, said second processing engine, a third processing engine and a fourth processing engine, and wherein said establishing comprises mapping three pipe registers between said first processing engine and said second, third and fourth processing engines.

11. The method of claim 1, wherein said establishing comprises dynamically mapping general purpose registers of said first processing engine and general purpose registers of said second processing engine to establish said register pipe.

12. The method of claim 11, wherein said dynamically mapping comprises employing a first control register associated with said first processing engine and a second control register associated with said second processing engine to map said general purpose registers of said first and second processing engines, respectively, to said register pipe.

13. The method of claim 1, wherein said first processing engine and said second processing engine are part of a multi-processing engine environment, and wherein said method further comprises implementing a barrier synchronization among at least some processing engines of said multi-processing engine environment.

14. The method of claim 13, wherein said implementing comprises processing at each of at least some processing engines of said multi-processing engine environment an instruction to said engine to read from a register pipe addressed to said engine, wherein synchronization between said at least some processing engines is established upon each engine of said at least some engines executing said instruction to read from its register pipe addressed thereto.

15. The method of claim 14, further comprising establishing at each processing engine of said at least some processing engines its own register pipe addressed thereto.

16. The method of claim 13, wherein said multi-processing engine environment comprises four processing engines and multiple register pipes, each processing engine addressing four register pipes, said four processing engines comprising said first processing engine, said second processing engine, a third processing engine and a fourth processing engine, said four register pipes addressable by each processing engine comprising three register pipes coupling said processing engine to the other of said four processing engines and a fourth register pipe addressed to itself.

17. The method of claim 16, wherein when said fourth register pipe addressed to itself is employed to write data, said data is broadcast from said processing engine to said other processing engines of said multi-processing engine environment.

18. The method of claim 1, wherein said establishing comprises establishing a direct register pipe between said first processing engine and said second processing engine.

19. The method of claim 1, wherein said establishing comprises establishing an indirect register pipe between said first processing engine and said second processing engine through a switching fabric coupling said first processing engine and said second processing engine.

20. The method of claim 1, wherein said establishing comprises providing an instruction architecture which identifies use of a register pipe between said first processing engine and said second processing engine, said instruction architecture including an operand field in a general purpose register instruction used to address said register pipe.

21. A system of transferring data between a first processing engine and a second processing engine, said system comprising:
means for establishing a register pipe between said first processing engine and said second processing engine, said means for establishing including means for mapping general purpose registers of said first processing engine to general purpose registers of said second processing engine to establish said register pipe; and
means for transferring data between said first processing engine and said second processing engine using said register pipe, wherein data is transferred between said first and second processing engines without passing through memory.

22. The system of claim 21, wherein said register pipe comprises at least one first register in said first processing engine and at least one second register in said second processing engine.

23. The system of claim 22, wherein said register pipe is bidirectional and wherein said at least one first register comprises a first inlet register and a first outlet register and wherein said at least one second register comprises a second inlet register and a second outlet register.

24. The system of claim 23, wherein said first inlet register, first outlet register, second inlet register and second outlet register comprise general purpose registers.

25. The system of claim 24 wherein said means for establishing comprises means for mapping said general purpose registers as said register pipe coupling said first processing engine and said second processing engine.

26. The system of claim 23, wherein said register pipe comprises a first pipe section for transferring data from said first processing engine to said second processing engine, and a second pipe section for transferring data from said second processing engine to said first processing engine, said first pipe section comprising a first first-in, first-out (FIFO) buffer comprising said first outlet register and said second inlet register, and said second pipe section comprising a second FIFO buffer comprising said first inlet register and said second outlet register.

27. The system of claim 26, wherein said means for transferring comprises means for filling said first pipe section by writing data to said first outlet register for forwarding to said second processing engine, and means for emptying said first pipe section by reading data from said first FIFO buffer through said second inlet register whenever said first FIFO buffer is full.

28. The system of claim 26, wherein said means for transferring comprises means for filling said second pipe section by writing data to said second outlet register for forwarding to said first processing engine, and means for emptying said second pipe section by reading data from said second FIFO buffer through said first inlet register whenever said second FIFO buffer is full.

29. The system of claim 21, wherein said first processing engine and said second processing engine are part of a multi-processing engine environment, and wherein said means for establishing comprises means for mapping a different register pipe between each pair of at least some pairs of processing engines in said multi-processing engine environment.

30. The system of claim 29, wherein said multi-processing engine environment comprises four processing engines, said four processing engines comprising said first processing engine, said second processing engine, a third processing engine and a fourth processing engine, and wherein said means for establishing comprises means for mapping three pipe registers between said first processing engine and said second, third and fourth processing engines.

31. The system of claim 21, wherein said means for establishing comprises means for dynamically mapping general purpose registers of said first processing engine and general purpose registers of said second processing engine to establish said register pipe.

32. The system of claim 31, wherein said means for dynamically mapping comprises means for employing a first control register associated with said first processing engine and a second control register associated with said second processing engine to map said general purpose registers of said first and second processing engines, respectively, to said register pipe.

33. The system of claim 21, wherein said first processing engine and said second processing engine are part of a multi-processing engine environment, and wherein said system further comprises means for implementing a barrier synchronization among at least some processing engines of said multi-processing engine environment.

34. The system of claim 33, wherein said means for implementing comprises means for processing at each of at least some processing engines of said multi-processing engine environment an instruction to said engine to read from a register pipe addressed to said engine, wherein synchronization between said at least some processing engines is established upon each engine of said at least some engines executing said instruction to read from its register pipe addressed thereto.

35. The system of claim 34, further comprising means for establishing at each processing engine of said at least some processing engines its own register pipe addressed thereto.

36. The system of claim 33, wherein said multi-processing engine environment comprises four processing engines and multiple register pipes, each processing engine addressing four register pipes, said four processing engines comprising said first processing engine, said second processing engine, a third processing engine and a fourth processing engine, said four register pipes addressable by each processing engine comprising three register pipes coupling said processing engine to the other of said four processing engines and a fourth register pipe addressed to itself.

37. The system of claim 36, wherein when said fourth register pipe addressed to itself is employed to write data, said data is broadcast from said processing engine to said other processing engines of said multi-processing engine environment.

38. The system of claim 21, wherein said means for establishing comprises means for establishing a direct register pipe between said first processing engine and said second processing engine.

39. The system of claim 21, wherein said means for establishing comprises means for establishing an indirect register pipe between said first processing engine and said second processing engine through a switching fabric coupling said first processing engine and said second processing engine.

40. The system of claim 21, wherein said means for establishing comprises means for providing an instruction architecture which identifies use of a register pipe between said first processing engine and said second processing engine, said instruction architecture including an operand field in a general purpose register instruction used to address said register pipe.

41. A multi-processor computer system including a first processing engine and a second processing engine, said multiprocessor computer system comprising:
   a register pipe between said first processing engine and said second processing engine, said register pipe comprising at least one general purposes register in said first processing engine mapped to at least one general purpose register in said second processing engine; and
   wherein said first processing engine and said second processing engine are adapted to transfer data therebetween using said register pipe and without passing said data through memory of said multiprocessor computer system.

42. At least one program storage device readable by a machine, tangibly embodying at least one program of instructions executable by the machine to perform a method of transferring data between a first processing engine and a second processing engine, said method comprising:
   establishing a register pipe between said first processing engine and said second processing engine, said establishing including mapping general purpose registers of said first processing engine to general purpose registers of said second processing engine to establish said register pipe; and
   transferring data between said first processing engine and said second processing engine using said register pipe, wherein data is transferred between said first and second processing engines without passing through memory.

43. The at least one program storage device of claim 42, wherein said register pipe comprises at least one first register in said first processing engine and at least one second register in said second processing engine.

44. The at least one program storage device of claim 43, wherein said register pipe is bidirectional and wherein said at least one first register comprises a first inlet register and a first outlet register and wherein said at least one second register comprises a second inlet register and a second outlet register.

45. The at least one program storage device of claim 44, wherein said first inlet register, first outlet register, second inlet register and second outlet register comprise general purpose registers.

46. The at least one program storage device of claim 45, wherein said establishing comprises mapping said general purpose registers as said register pipe coupling said first processing engine and said second processing engine.

47. The at least one program storage device of claim 44, wherein said register pipe comprises a first pipe section for transferring data from said first processing engine to said second processing engine, and a second pipe section for transferring data from said second processing engine to said first processing engine, said first pipe section comprising a first first-in, first-out (FIFO) buffer comprising said first outlet register and said second inlet register, and said second pipe section comprising a second FIFO buffer comprising said first inlet register and said second outlet register.

48. The at least one program storage device of claim 47, wherein said transferring comprises filling said first pipe section by writing data to said first outlet register for forwarding to said second processing engine, and emptying said first pipe section by reading data from said first FIFO buffer through said second inlet register whenever said first FIFO buffer is full.

49. The at least one program storage device of claim 47, wherein said transferring comprises filling said second pipe section by writing data to said second outlet register for forwarding to said first processing engine, and emptying said second pipe section by reading data from said second FIFO buffer through said first inlet register whenever said second FIFO buffer is full.

50. The at least one program storage device of claim 42, wherein said first processing engine and said second processing engine are part of a multi-processing engine environment, and wherein said establishing comprises mapping a different register pipe between each pair of at least some pairs of processing engines in said multi-processing engine environment.

51. The at least one program storage device of claim 50, wherein said multi-processing engine environment comprises four processing engines, said four processing engines comprising said first processing engine, said second processing engine, a third processing engine and a fourth processing engine, and wherein said establishing comprises mapping three pipe registers between said first processing engine and said second, third and fourth processing engines.

52. The at least one program storage device of claim 42, wherein said establishing comprises dynamically mapping general purpose registers of said first processing engine and general purpose registers of said second processing engine to establish said register pipe.

53. The at least one program storage device of claim 52, wherein said dynamically mapping comprises employing a first control register associated with said first processing engine and a second control register associated with said second processing engine to map said general purpose registers of said first and second processing engines, respectively, to said register pipe.

54. The at least one program storage device of claim 42, wherein said first processing engine and said second processing engine are part of a multi-processing engine environment, and wherein said method further comprises implementing a barrier synchronization among at least some processing engines of said multi-processing engine environment.

55. The at least one program storage device of claim 54, wherein said implementing comprises processing at each of at least some processing engines of said multi-processing engine environment an instruction to said engine to read from a register pipe addressed to said engine, wherein synchronization between said at least some processing engines is established upon each engine of said at least some engines executing said instruction to read from its register pipe addressed thereto.

56. The at least one program storage device of claim 55, further comprising establishing at each processing engine of said at least some processing engines its own register pipe addressed thereto.

57. The at least one program storage device of claim 54, wherein said multi-processing engine environment comprises four processing engines and multiple register pipes, each processing engine addressing four register pipes, said four processing engines comprising said first processing engine, said second processing engine, a third processing engine and a fourth processing engine, said four register pipes addressable by each processing engine comprising three register pipes coupling said processing engine to the other of said four processing engines and a fourth register pipe addressed to itself.

58. The at least one program storage device of claim 57, wherein when said fourth register pipe addressed to itself is employed to write data, said data is broadcast from said processing engine to said other processing engines of said multi-processing engine environment.

59. The at least one program storage device of claim 42, wherein said establishing comprises establishing a direct register pipe between said first processing engine and said second processing engine.

60. The at least one program storage device of claim 42, wherein said establishing comprises establishing an indirect register pipe between said first processing engine and said second processing engine through a switching fabric coupling said first processing engine and said second processing engine.

61. The at least one program storage device of claim 42, wherein said establishing comprises providing an instruction architecture which identifies use of a register pipe between said first processing engine and said second processing engine, said instruction architecture including an operand field in a general purpose register instruction used to address said register pipe.

* * * * *